United States Patent [19]

Renfrew et al.

[11] 3,909,198

[45] Sept. 30, 1975

[54] POLYESTER MATERIAL DYED WITH YELLOW METHINE DYES

[75] Inventors: Edgar Earl Renfrew; Henry Wolfgang Pons, both of Lock Haven, Pa.

[73] Assignee: American Aniline Products, Inc., Charlotte, N.C.

[22] Filed: June 28, 1973

[21] Appl. No.: 374,773

[52] U.S. Cl............................ 8/179; 8/21 C; 8/79; 8/176; 8/DIG. 4; 260/465 D
[51] Int. Cl................................................ D06p 3/52
[58] Field of Search ........ 8/179, DIG. 4; 260/465 D

[56] References Cited
UNITED STATES PATENTS

| | | | |
|---|---|---|---|
| 3,247,215 | 4/1966 | Fisher et al........................ | 8/179 X |
| 3,808,255 | 4/1974 | Schweizer et al..................... | 8/179 |
| 3,829,461 | 8/1974 | Raue et al.......................... | 260/470 |

*Primary Examiner*—Leland A. Sebastian
*Attorney, Agent, or Firm*—Armstrong, Nikaido & Wegner

[57] ABSTRACT

Yellow methine dyes are produced according to the following synthesis: A N-2-hydroxyethylaniline is treated with an aroyl chloride, whereby there is produced an aroyl ester, which is converted to an aldehyde via the Vilsmeier synthesis; this intermediate aldehyde is converted into the yellow methine dyes of the invention by treatment with a nitrile reactant. The resultant yellow methine dyes are excellent dyestuffs for polyester fabrics, in particular polyethylene terephthalate. The properties of these dyeings are very satisfactory; in particular, the fastness to light and resistance to sublimation when subject to heat treatment are excellent. The dyes are applied by carrier dyeing, pressure dyeing and by thermofixation, as well as other established methods.

3 Claims, No Drawings

POLYESTER MATERIAL DYED WITH YELLOW METHINE DYES

BACKGROUND OF THE INVENTION

Various dyestuffs in the general area of methine dyes have been proposed in recent years. Among reported research efforts may be mentioned patents to Straley et al, U.S. Pat. No. 3,504,010, relating to carbamic acid esters. Kartinos et al, U.S. Pat. No. 2,766,233 (260-240), teach certain structures derived from diphenylamines. Weaver et al, U.S. Pat. No. 3,386,491, teach various sulfones. Merian et al, U.S. Pat. No. 2,850,520 describe various urethanes. Finally, Belgian patent 764,523 (Martin Marietta) describes various diesters.

We have now discovered a new class of yellow methine dyestuffs yielding excellent colorations on polyesters, particularly polyethylene terephthalate textile materials.

SUMMARY OF THE INVENTION

In accordance with our invention, we provide yellow methine dyestuffs of the formula

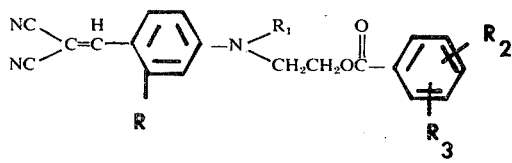
(I)

wherein
R is hydrogen or methyl;
$R_1$ is lower alkyl;
$R_2$ and $R_3$ are independently hydrogen, hydroxyl, lower alkyl, lower alkoxyl, nitro, chloro, bromo, cyano, lower aliphatic acyl, lower alkylthio, lower alkyl sulfonyl, benzoyl, chlorobenzoyl, bromobenzoyl, (lower alkyl)benzoyl, (lower alkoxy)benzoyl, phenylsulfonyl, chlorophenylsulfonyl, bromophenylsulfonyl, (lower alkyl) phenylsulfonyl or (lower alkoxy)phenylsulfonyl. When $R_2$ and $R_3$ are chlorine, they may be present in the 2, 4 position on the benzene ring.

As "lower" groups may be mentioned the groups containing up to four carbon atoms. Thus, as lower alkyl may be mentioned methyl, ethyl, propyl and butyl; as lower alkoxy may be mentioned methoxy, ethoxy, propoxy and butoxy.

DETAILED DESCRIPTION OF THE INVENTION

Synthesis of the yellow methine dyestuffs (I) proceeds in the following manner (the structural parameters being defined in accordance with the above definition):

The starting material for the synthesis is a N-2-hydroxyethylaniline of the formula

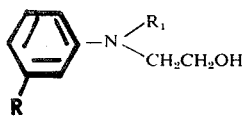
(II)

The N-2-hydroxyethylaniline is treated with an aroyl chloride of the formula:

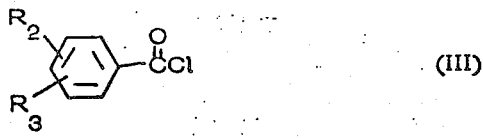
(III)

This reaction proceeds by adding to chlorobenzene approximately one mole of the appropriate aroyl chloride (III) and one mole of a N-2-hydroxyethylaniline (II) at a temperature of about 95°C. The charge is heated to boiling (ca. 136°–139°C) and stirred under reflux for a period of about 3 hours. Thereafter the charge is successively cooled, water is added, a portion of sodium acetate is added and thereafter the chlorobenzene is driven off via a steam distillation, whereby a yield of approximately 90% of an aroyl ester is achieved:

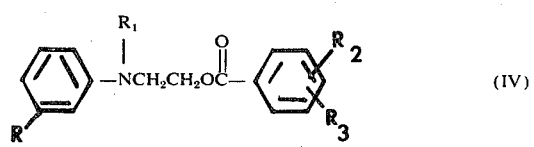
(IV)

The aroyl ester (IV) undergoes a Vilsmeier reaction in accordance with the disclosure of American Aniline Products, Inc., U.S. patent application Ser. No. 227,296, filed Feb. 17, 1972, now U.S. Pat. No. 3,756,778, by treatment with phosphorus oxychloride and dimethylformamide. The product of the Vilsmeier synthesis is an aldehyde having the formula:

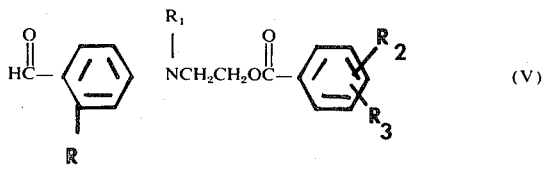
(V)

The aldehyde (V) is treated with malonitrile in accordance with the reaction procedure disclosed in said American Aniline Products, Inc., U.S. patent application Ser. No. 227,296, now U.S. Pat. No. 3,756,778, to yield the desired yellow methine dyestuffs (I).

To prepare the yellow methine dyestuffs (I) for application to the polyester substrates noted hereabove, it must be suitably dispersed. This may be done by any of several well-known methods: milling as in a ball-mill with dispersing agents such as lignin sulfonic acid materials, for instance. The resultant aqueous dispersion can be dried, as in a spray-dryer, or preserved and used as a paste. Standardization to any desired lower strength can be done with inert colorless diluents such as inorganic salts for powders, or water for pastes. Other materials such as preservatives, foam-control agents, and melting agents may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates; e.g., the condensation products of sulfonated naphthalene and formaldehyde, such as sodium dinaphthylmethane disulfonate, are conveniently used. The oil disperse paste may be cut or standardized to a standard strength with water. The final color content of the finished paste averages from 10–40 percent by weight (pure color) active dye base.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylphenoxy polyethanol may be added to aid in wetting out the product when it is placed in the dye bath. Disperse powders are usually cut or standardized to 25–60 percent by weight color content (pure color).

The dye, when added to water with or without auxiliary agents, forms a near colloidal aqueous dispersion from which the aromatic polyester fiber or textile material is dyed in the conventional manner at 40°–100°C(104°–212°F) to give a colored fiber containing about 0.01–2 percent by weight dye (100% color basis).

Alternatively, dyeing may be accomplished without a carrier at temperatures of 100°–150°C under pressure. Also, the dye may be applied in patterns by conventional printing methods, if desired.

The dye can also be applied to the aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperature of 180°–220°C(356°–428°F) are used for 30 to 90 seconds. If the fabric contains cotton or viscose rayon, apart from synthetic fibers, there is little danger of damaging cellulosic portions, but if wool is present, the temperature must be kept within 180°–200°C and the time must be reduced to 30 seconds.

In order to evaluate the effectiveness of a particular dye for a given type of fiber, the dyed fiber is examined for substantivity of the color, light fastness of the color, and resistance of the color to sublimation.

It should be particularly noted that although the molecules are larger in size than most of the methine or styryl dyes proposed heretofore, they are unexpectedly substantive; the dyeings are of fully acceptable strengths and exhibit good build-up properties. The dyeings have excellent fastness characteristics, particularly with respect to sublimation fastness.

The following examples serve to further illustrate my invention:

EXAMPLE 1

2-[4-(2,2-Dicyanovinyl)-N-ethyl-3-methylanilino]ethyl benzoate a. 2-(N-Ethyl-m-toluidino)ethyl benzoate To a 500 ml. flask equipped with a heater, a stirrer, a thermometer, a dropping funnel and a vertical condenser is charged

| | |
|---|---|
| 89.6 g. | 2-(N-ethyl-m-toluidino)ethanol(M.W. 179.3; 0.5 mol) |

-Continued

| | |
|---|---|
| | and |
| 250.0 g. | chlorobenzene. At 95°C is added dropwise |
| 72.0 g. | benzoyl chloride (M.W. 140.5; 0.51 mol). After the addition is complete, the temperature is raised to the boil (136° to 139°C). The charge is stirred under reflux for three hours. |
| | The mass is allowed to cool to 60°C and is then transferred to a 5-liter flask equipped for steam distillation, together with |
| 200.0 g. | ice, |
| 2000.0 g. | water and |
| 41.0 g. | sodium acetate. Steam is lead in. When no more chlorobenzene is present in the condensate, the oily residue in the distillation vessel is separated from the aqueous layer, transferred to a suitable vessel and dried under reduced pressure at 50–70°C to constant weight. |
| | Weight, 130.5 g. Yellow liquid $C_{18}H_{21}NO_2$; M.W. = 283.4; 0.5 mol = 142 Percent Yield, 92%. | b. 2(N-ethyl-4-formyl-3-methylanilino)ethyl benzoate.

To a 500 ml flask equipped with a stirrer, a heater, a thermometer and a dropping funnel is charged

| | |
|---|---|
| 132.0 g. | dimethyl formamide and |
| 56.6 g. | 2-(N-ethyl-m-toluidino)ethyl benzoate (M.W. 283.4; 0.2 mol). |
| | At 5–10°C is added dropwise |
| 30.6 g. | phosphorus oxychloride. After the addition is complete, the temperature is raised slowly to 90–92°C and the reaction mass is stirred at that temperature for two hours. Heating is discontinued and the temperature is allowed to drop to 30°C. The flask contents form a clear solution. | c. 2-[4(2,2-Dicyanovinyl)-N-ethyl-3-methylanilino]ethyl benzoate

To a 2000 ml. flask equipped with a dropping funnel, a stirrer, a heater and a thermometer is charged

| | |
|---|---|
| 1000 ml. | cold water. Under external cooling, the solution from b) is slowly added while stirring. An oil separates. Then is added below 12°C enough sodium hydroxide solution to give an alkaline test to Brilliant Yellow, about |
| 83.0 g. | sodium hydroxide solution, 25% weight. The supernatant liquid is discarded and the residue is washed with |
| 1000 ml. | water at 8°C. The washing water is drawn off and discarded. To the residue is added |
| 5.0 g. | sodium acetate and |
| 300.0 g. | denatured ethanol. The mixture is warmed to 50°C, at which temperature it is a solution which is neutral to Congo Red. Then is added |
| 0.8 g. | piperidine and |
| 14.8 g. | malononitrile. The solution is heated to 80°C, stirred at that temperature for 4½ hours and the is allowed to cool to 30°C over a period of 16 hours. External cooling is then applied to bring the internal temperature to 10°C. The crystalline materials which is formed on cooling is collected on a suction filter, washed with three washings of cold denatured ethanol and dried. |
| | Weight 59.0 g. Yellow crystals MP 112–113°C $C_{22}H_{21}N_3O_2$, M.W. 359. Theoretical yield (based on 0.2 mole charged in b) 71.8 g. Percent yield, 82%. | d. Dispersion

To a ball-mill is charged

| | |
|---|---|
| 50.0 g. | 2-[4-(2,2-dicyanovinyl)-N-ethyl-3-methylanilino]-ethyl benzoate, |
| 50.0 g. | sodium ligninsulfonate, |
| 234.0 g. | water and 3 drops of a commercial antifoam agent described as a "ditertiary acetylenic glycal surfactant". The ball-mill is turned until a suitable dispersion is reached, as shown by established filtration tests. Polyester fabric dyed in the usual ways (carrier, pressure, thermofix) showed a bright, greenish-yellow hue. Sublimation was very good at 350°F. Resistance to both carbon arc and xenon lamp radiation is excellent. |

EXAMPLE 2

2-[4-(2,2-Dicyanovinyl)-N-ethyl-3-methylanilino]ethyl p-nitrobenzoate.

In the way described in Example 1, the subject dye of Example 2 may be prepared by substituting in Part (a) 94.6 g. p-nitrobenzoyl chloride instead of 72.0 g. benzoyl chloride, and similarly using the indicated molar amounts in Parts (b) and (c).

A 15% paste made in the manner of Example 1, Part (d), yielded on polyester yellow dyeings somewhat redder in shade than those of Example 1. The dyeings were similar in lightfastness and somewhat better in sublimation fastness, being very good at 400°F.

EXAMPLE 3

2-[4-(2,2-Dicyanovinyl)-N-ethyl-3-methylanilino]ethyl 2,4-dichlorobenzoate.

By substituting 106.8 g. 2,4-dichlorobenzoyl chloride for the benzoyl chloride in Part a, Example 1, 2-(N-ethyl-m-toluidino) ethyl 2,4-dichlorobenzoate was achieved in good yield. By substituting equivalent amounts in the procedures for Parts b and c, the styryl dye is obtained in good yield.

Polyester dyed with the disperse dye formulated according to Part d, Example 1 was bright, greenish-yellow. Light fastness was equal to the dyed goods of Example 1 and 2; sublimation fastness was excellent, showing only trace transfer in the standard AATCC test at 400°F.

EXAMPLE 4

By following the procedure of Example 1 and substituting appropriate reactants in the procedure of that example, the following dyestuff is obtained.

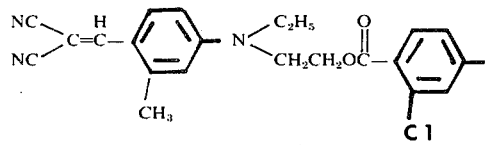

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 5

By following the procedure of Example 1 and substituting appropriate reactants in the procedure of that example, the following dyestuff is obtained.

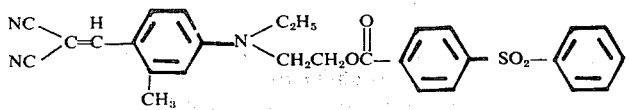

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 6

By following the procedure of Example 1 and substituting appropriate reactants in the procedure of that example, the following dyestuff is obtained.

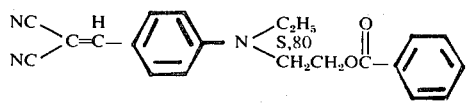

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 7

By following the procedure of Example 1 and substituting appropriate reactants in the procedure of that example, the following dyestuff is obtained.

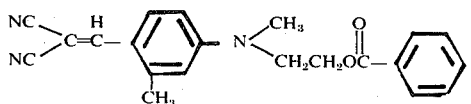

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 8

By following the procedure of Example 1 and substituting appropriate reactants in the procedure of that example, the following dyestuff is obtained.

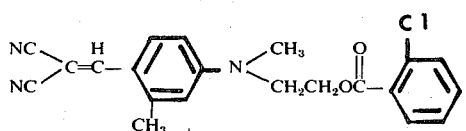

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 9

By following the procedure of Example 1 and substituting appropriate reactants in the procedure of that example, the following dyestuff is obtained.

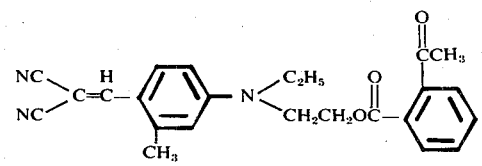

This dyestuff provdes a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 10

By following the procedure of Example 1 and substituting appropriate reactants in the procedure of that example, the following dyestuff is obtained.

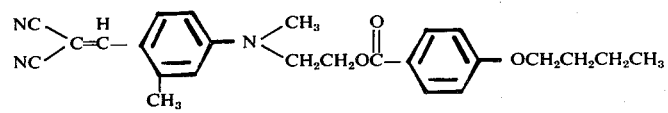

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 11

By following the procedure of Example 1 and substituting appropriate reactants in the procedure of that example, the following dyestuff is obtained.

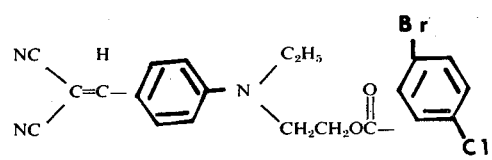

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 12

By following the procedure of Example 1 and substituting appropriate reactants in the procedure of that Example, the following dyestuff is obtained.

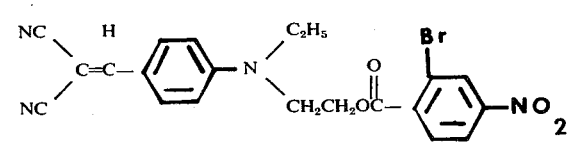

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 13

By following the procedure of Example 1 and substituting appropriate reactants in the procedure of that example, the following dyestuff is obtained.

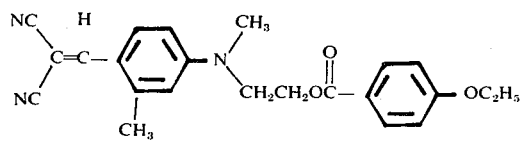

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 14

By following the procedure of Example 1 and substituting appropriate reactants in the procedure of that example, the following dyestuff is obtained.

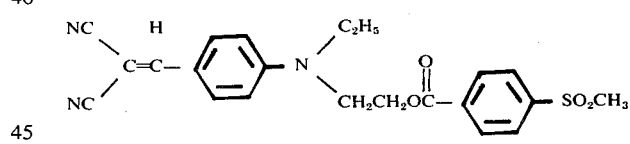

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 15

By following the procedure of Example 1 and substituting appropriate reactants in the procedure of that example, the following dyestuff is obtained.

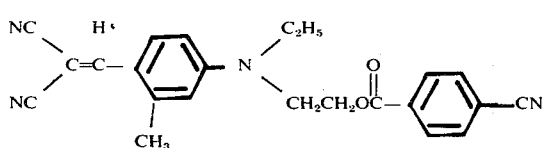

This dyestuff provides a bright, greenish-yellow hue on polyethylene terephthalate. The sublimation fastness of the dyeings and the resistance to both carbon

EXAMPLE 16

By following the procedure of Example 1 and substituting appropriate reactants in the procedure of that example, the following dyestuff is obtained.

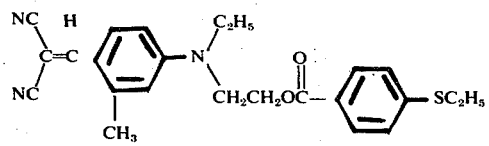

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 17

By following the proecdure of Example 1 and sustituting appropriate reactants in the procedure of that example, the following dyestuff is obtained.

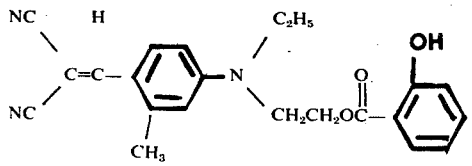

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 18

By following the procedure of Example 1 and substituting appropriate reactants in the procedure of that example, the following dyestuff is obtained.

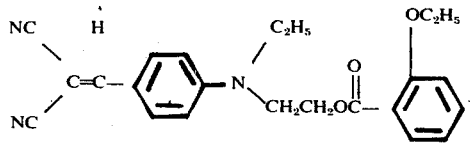

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

EXAMPLE 19

By following the procedure of Example 1 and substituting appropriate reactants in the procedure of that example, the following dyestuff is obtained.

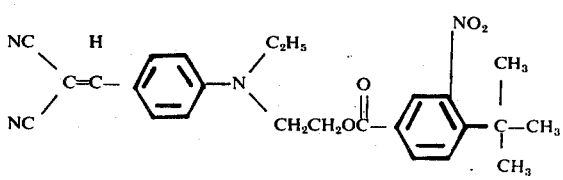

This dyestuff provides a bright, greenish-yellow hue on polyethylene terephthalate. The sublimation fastness of the dyeings and the resistance to both carbon arc and xenon lamp radiation indicate that the above dyestuffs are suitable for the dyeing of polyester fabric materials, particularly polyethylene terephthalate.

What is claimed is:

1. A polyester textile material dyed with a compound of the formula:

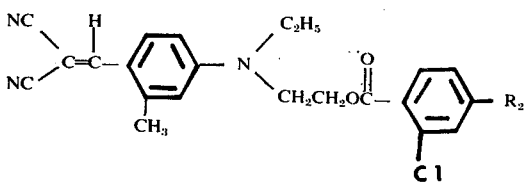

in which $R_2$ is H or Cl.

2. A polyester textile material of claim 1 in which $R_2$ is Cl.

3. A polyester textile material of claim 1 in which $R_2$ is H.

* * * * *